United States Patent
Han

(10) Patent No.: US 8,902,187 B2
(45) Date of Patent: Dec. 2, 2014

(54) TOUCH INPUT METHOD AND APPARATUS OF PORTABLE TERMINAL

(71) Applicant: Samsung Electronics Co. Ltd., Suwon-si, Gyeonggi-do (KR)

(72) Inventor: Sungwon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 13/713,893

(22) Filed: Dec. 13, 2012

(65) Prior Publication Data

US 2013/0154975 A1  Jun. 20, 2013

(30) Foreign Application Priority Data

Dec. 16, 2011  (KR) .................. 10-2011-0136100

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01)
USPC ........... 345/173; 345/156; 345/158; 715/863; 715/857

(58) Field of Classification Search
CPC .......... G06F 2200/1637; G06F 3/0488; G06F 3/0346; G06F 3/04886; G06F 3/0485; G06F 3/0482; G06F 3/017; G06F 2203/04803; H04M 1/72583; H04M 2250/12
USPC .......... 345/173, 158, 156, 169, 157; 715/863, 715/857, 864, 788
See application file for complete search history.

(56) References Cited

U.S. PATENT DOCUMENTS

| | | | |
|---|---|---|---|
| 8,487,882 B2 * | 7/2013 | Inaba et al. .................... | 345/173 |
| 2002/0140666 A1 * | 10/2002 | Bradski .......................... | 345/156 |
| 2003/0038778 A1 * | 2/2003 | Noguera ........................ | 345/157 |
| 2009/0262074 A1 * | 10/2009 | Nasiri et al. .................. | 345/158 |
| 2010/0146460 A1 * | 6/2010 | Dunko .......................... | 715/863 |

* cited by examiner

*Primary Examiner* — Koosha Sharifi-Tafreshi
(74) *Attorney, Agent, or Firm* — Jefferson IP Law, LLP

(57) ABSTRACT

A touch input method of a portable terminal which enables touch input to an entire region of a touch screen using a partial region of the touch screen in a state where a hand gripping of the portable terminal cannot touch all regions of the touch screen, and an apparatus thereof, are provided. The touch input method includes detecting touch input on one of divided touch regions of a touch screen, detecting a tilted state of the portable terminal when the touch input is detected, determining one of divided touch regions as a touch reflection region in which a touch event generated from a region in which the touch input is detected is reflected according to the detected tilted state of the portable terminal, and processing the touch event generated from the region in which the touch input is detected as the touch event reflected in the touch reflection region.

20 Claims, 5 Drawing Sheets

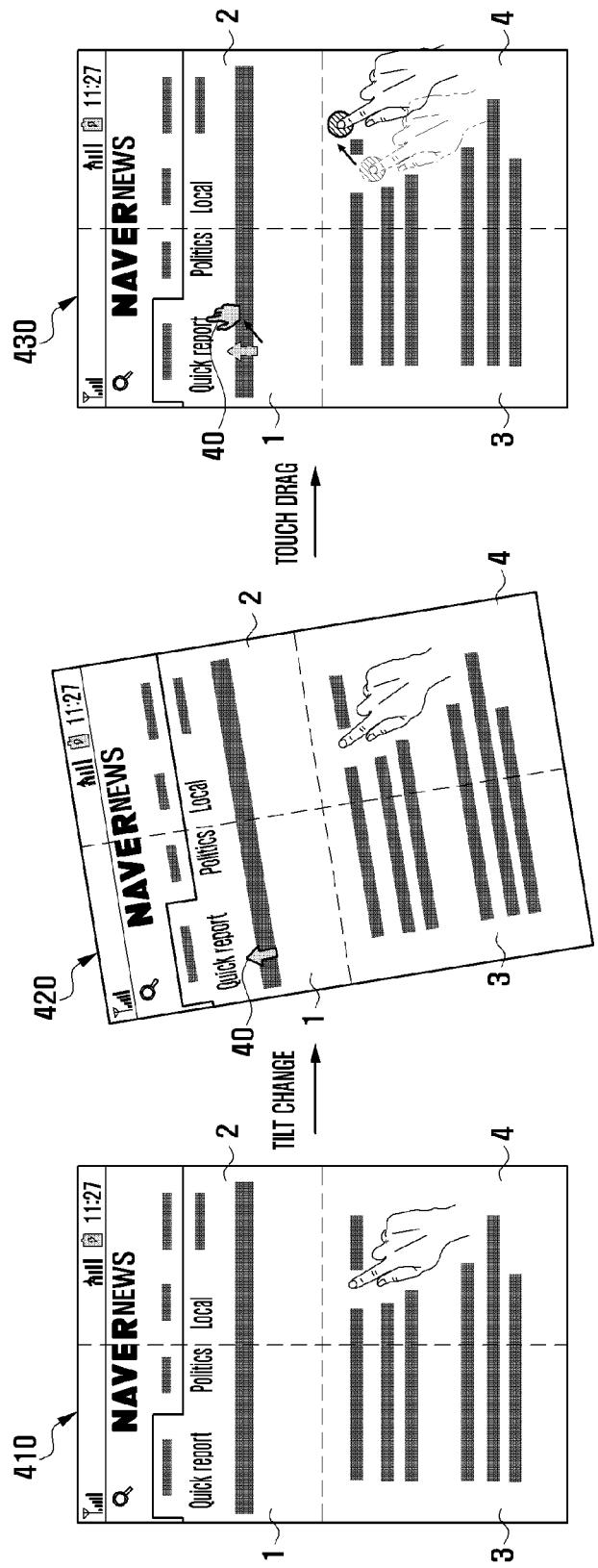

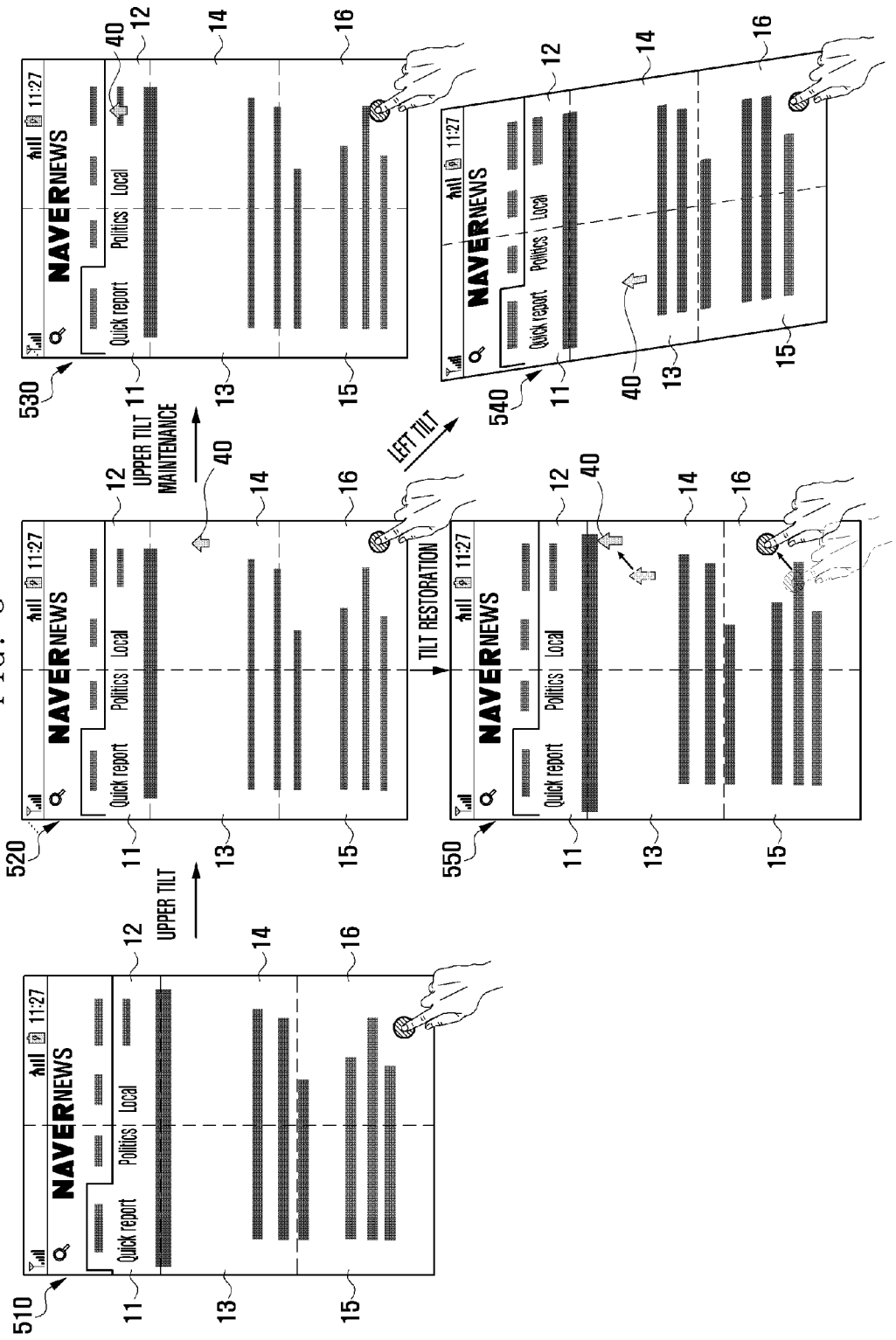

TOUCH INPUT METHOD AND APPARATUS OF PORTABLE TERMINAL

PRIORITY

This application claims the benefit under 35 U.S.C. §119 (a) of a Korean patent application filed on Dec. 16, 2011 in the Korean Intellectual Property Office and assigned Serial No. 10-2011-0136100, the entire disclosure of which is hereby incorporated by reference.

BACKGROUND OF THE INVENTION

1. Field of the Invention

The present invention relates to a touch input method and apparatus. More particularly, the present invention relates to a touch input method of a portable terminal which enables touch input to a total region of a touch screen using a partial region of the touch screen, and an apparatus thereof.

2. Description of the Related Art

With the significant development of information and communication technology and a semiconductor technology, supply and use of portable terminals have rapidly increased. The portable terminal has provided various functions such as a call function, a music playback function, a character message transmission/reception function, a digital broadcasting receiving function, a near field wireless communication function, and an Internet connection function. Particularly, a multimedia function such as a moving image playback or games is emphasized in a recent portable terminal. Since the multimedia function is emphasized, a display size of the portable terminal is increased and a touch screen has been adopted due to convenience of an input.

A user of a portable terminal including the touch screen touches a touch screen with a touch input device such as a finger to perform touch input. However, as the size of the touch screen is increased, it is difficult to touch all regions of the touch screen with one finger. Particularly, it is difficult to touch all regions of the touch screen by one hand gripping the portable terminal. Due to this, there is inconvenience to the user in that the user must use the touch screen using two hands or use the touch screen in a state where the portable terminal is mounted.

Accordingly, there is a need for an approach capable of performing touch input with respect to all regions of the touch screen using one hand.

SUMMARY OF THE INVENTION

Aspects of the present invention are to address at least the above-mentioned problems and/or disadvantages and to provide at least the advantages described below. Accordingly, an aspect of the present invention is to provide a touch input method of a portable terminal which enables touch input to an entire region of a touch screen using a partial region of the touch screen in a state where a one hand gripping of the portable terminal cannot touch all regions of the touch screen, and an apparatus thereof.

In accordance with an aspect of the present invention, a touch input method of a portable terminal is provided. The method includes detecting a touch input on one of a plurality of divided touch regions of a touch screen, detecting a tilted state of the portable terminal when the touch input is detected, determining one of the plurality of divided touch regions as a touch reflection region in which a touch event generated from a region in which the touch input is detected is reflected according to the detected tilted state of the portable terminal, and processing a touch event generated from the region in which the touch is detected as a touch event generated from the determined touch reflection region.

In accordance with another aspect of the present invention, a touch input apparatus of a portable terminal is provided. The apparatus includes a touch screen divided into a plurality of touch regions, a sensor measuring a tilted state of the portable terminal, and a controller detecting the titled state of the portable terminal, determining one of the plurality of divided touch regions as a touch reflection region which a touch event generated from a region in which the touch input is detected is reflected according to the detected tilted state of the portable terminal, and processing the touch event generated from a touch region in which the touch input is detected as the touch event reflected in the determined touch reflection region when the touch input is detected from one of the touch regions.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is an exemplary diagram of a screen illustrating a touch input method of a portable terminal according to another exemplary embodiment of the present invention; and FIG. 5 is an exemplary diagram of a screen illustrating a touch input method of a portable terminal according to a still another exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
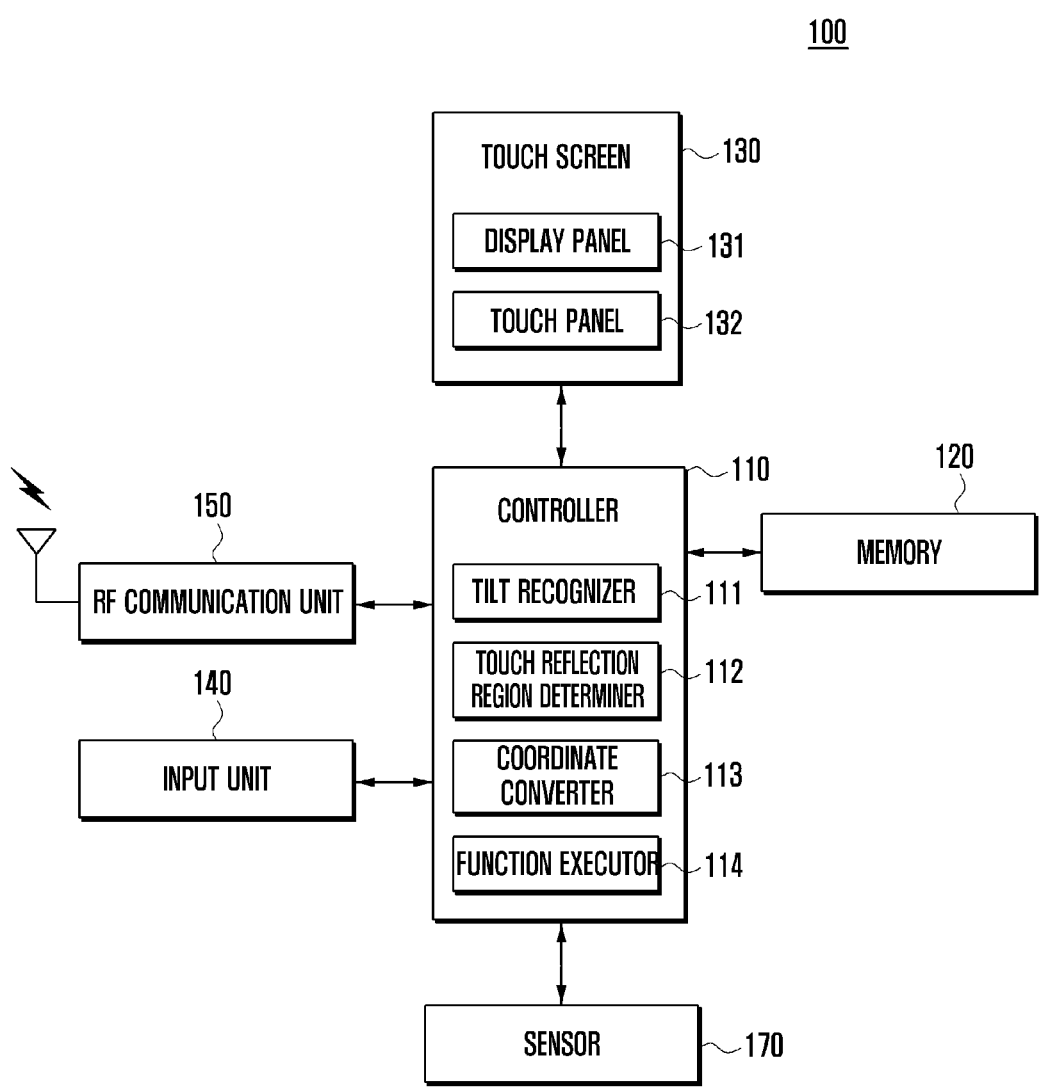
FIG. 1 is a block diagram schematically illustrating a configuration of a portable terminal according to an exemplary embodiment of the present invention.

FIG. 1 is a block diagram schematically illustrating a configuration of a portable terminal according to an exemplary embodiment of the present invention.

Referring to FIG. 1, a portable terminal 100 may include a sensor 170, a Radio Frequency (RF) communication unit 150, an input unit 140, a touch screen 130, a memory 120, and a controller 110. The touch screen 130 may include a display panel 131 and a touch panel 132. The controller 110 may include a tilt recognizer 111, a touch reflection region determiner 112, a coordinate converter 113, and a function executor 114.

In embodiments of the present invention, an overall touch area of the touch panel is divided into a number of different regions. When a touch is made by a user at a first position within a first region, the effective touch position (i.e. the touch position used by the portable terminal in subsequent operations controlled by the touch) is determined as a second position within a second region. The second region may be the same as the first region, or may be a different region. In the case that the first and second regions are the same, the first and second positions may be the same.

The second region may be determined, for example, based on a tilt state, or tilt state change, of the portable terminal. The second position may be determined, for example, such that the spatial relationship between the first position and a certain reference point (e.g. a certain corner or the centre point) of the first region is the same as the spatial relationship between the second position and the corresponding reference point of the second region.

Various ways to determine the second region based on the first region together with the tilt state, or tilt state change, of the portable terminal (or any other suitable manipulation of the portable terminal) will readily occur to the skilled person. The present invention is not limited to the specific examples described herein. Various ways in which the first position in the first region may be converted to a corresponding second position in the second region will readily occur to the skilled person. The present invention is not limited to the specific examples described herein.

The first region (in which an actual touch is detected) may be regarded as a "touch detection region". The second region (in which the effective touch position occurs) may be regarded as a "touch reflection region" since touches made by the user within the first region are reflected as effective touches at corresponding positions within the second region.

The RF communication unit 150 may form a communication channel for a call (including a voice call and an video call) and a data communication channel for transmitting data. To do this, the RF communication unit 150 may include an RF transmitter (not shown) up-converting a frequency of a transmitted signal and amplifying the converted signal, an RF receiver (not shown) low-noise-amplifying a received signal and down-converting a frequency of the amplified signal, and a transmission/reception separator (not shown) separating the received signal from the transmitted signal. Meanwhile, when the portable terminal 100 does not provide an RF communication function, the RF communication unit 150 may be omitted.

The input unit 140 may include input keys and function keys for receiving numerals or various character information, for setting various functions, and for controlling functions of the portable terminal 100. Particularly, the input unit 140 may transmit an input signal for controlling on/off a one hand touch mode to the controller 110. The input unit 140 may be configured by one or a combination of input means such as a button type key pad, a ball joystick, an optical joystick, a wheel key, a touch key, a touch pad, and the touch screen 130.

The touch screen 130 may execute an input function and an output function. To do this, the touch screen 130 may include a display panel 131 for executing the output function and a touch panel 132 for executing the input function.

The display panel 131 displays information input by the user or information provided to the user as well as various menus. For example, the display panel 131 may provide various screens, for example, an idle screen (home screen), a menu screen, a message creation screen, a call screen, a schedule managing screen, an address book screen, and a web page output screen. Particularly, the display panel 131 may provide various screens to be described below with reference to FIGS. 3 to 5. The display panel 131 may be configured by a Liquid Crystal Display (LCD), an Organic Light Emitted Diode (OLED), an Active Matrix Organic Light Emitted Diode (AMOLED), or the like.

The touch panel 132 is mounted in a front surface of the display panel 131, may generate a touch event according to contact of a touch input device, for example, a finger of a user or a stylus, and transfer the generated touch event to the controller 110. The touch panel 132 may recognize a touch through variation of a physical amount (e.g., capacitance, resistance, etc.) according to contact of the touch input device, and transfer a type of touch (e.g., Tap, Drag, Flick, Double-touch, Long-touch, and Multi-touch) and touched location information to the controller 110. The touch panel 132 is apparent to persons of ordinary skill in the art, and thus a detailed description thereof is omitted. Particularly, a touch region of the touch panel 132 may be divided into a plurality of regions in one hand touch mode. In this case, the touch panel 132 may detect a touch event (e.g., touch, touch drag, touch release, etc.) and transmit the detected touch event to the controller 110.

The sensor 170 may detect various state information of the portable terminal 100. Particularly, the sensor 170 may detect tilted state information of the portable terminal 100. The sensor 170 may detect tilted states with respect to at least four directions including up, down, left, and right directions. When the touch is detected in one of a plurality of touch regions in a one hand touch mode, the sensor 170 may be activated and transmit information (e.g., a sensor value) corresponding to a tilted state of the portable terminal 100 to the controller 110. The sensor 170 may be configured by one or a combination of a gyroscope sensor, a tilt sensor, an acceleration sensor, a geo-magnetic sensor, a gravity sensor, and the like.

The memory 120 may store an Operating System (OS) of the portable terminal 100, an application program used for other operations and/or functions, for example, a voice playback function, an image or moving image playback function, a broadcasting playback function, user data, transceived data, etc. For example, the memory 120 may store a key map or a menu map for operating the touch screen 130. The key map or the menu map may be configured in various forms. For instance, the key map may include a key board map, a 3*4 key map, a QWERTY key map, and a control key map for controlling an operation of a currently activated application program. The menu map may include a menu map for controlling an operation of a currently activated application program. The memory 120 may store a moving image file, a game file, a music file, a music file, etc. In particular, the memory 120 may store a one hand touch mode application program for controlling the one hand touch mode. The one touch mode application program may include a routine of controlling on/off of the one hand touch mode, a routine of detecting tilt change of the portable terminal 100 when the one touch mode is turned-on, a routine of determining a touch reflection region according to the tilt change of the portable terminal 100, a routine of converting a touch coordinate inputted in the touch detected region into a touch coordinate of the determined touch reflection region, and a routine of executing a function according to generation of the touch event. The memory 120 may store a reference value for determining that the portable terminal 100 is tilted toward at least one of up, down, left, and right. For example, the reference value may be 20°. The reference value is a relative value and not an absolute value, and refers to a changed degree in a tilted state of the portable terminal 100 when a touch is detected in one of a plurality of touch regions.

The controller 110 may control an overall operation of the portable terminal 100 and signal flow between internal blocks of the portable terminal 100, and execute a data processing function processing data. In particular, the controller 110 may turn-on/off one hand touch mode capable of inputting a touch on entire regions of the touch screen 130 through one of a plurality of touch regions on the touch screen 130 according to input of a preset function key signal or a selection signal through a menu. The controller 110 may control the one hand touch mode. To do this, the controller 110 may include the tilt recognizer 111, the touch reflection region determiner 112, the coordinate converter 113, and the function executor 114.

The tilt recognizer 111 may detect a tilted state of the portable terminal 100 based on a signal inputted from the sensor 170. For example, the tilt recognizer 111 may detect whether a tilt is changed in one of up, down, left, and left directions of the portable terminal 100 greater than a preset reference value (e.g., 20°). For example, when the portable terminal 100 is rotated in one of the up, down, left, and left directions greater than 20°, the tilt recognizer 111 may transmit a signal informing of a change of tilt (hereinafter, tilt change signal) to a touch reflection region determiner 112.

The touch reflection region determiner 112 may determine one of a plurality of touch regions as a touch reflection region according to a tilted state of the portable terminal 100 received from the tilt recognizer 111. When the tilt of the portable terminal 100 is not changed in a state where a touch region (e.g., third region 3 of FIG. 3) located in a lower left end among touch regions arranged in two rows and two columns is touched, the touch reflection region determiner 112 may determine a region in which the touch is detected as a touch reflection region. When the portable terminal 100 is tilted toward a right side in a state where a touch region (e.g., third region 3 of FIG. 3) located in a lower left end among touch regions arranged in two rows and two columns is touched, the touch reflection region determiner 112 determines a region located in a right side of the touched region 3 (e.g., fourth region 4 of FIG. 3) as the touch reflection region. When the portable terminal 100 is tilted upward, the touch reflection region determiner 112 determines a region (e.g., first region 1 of FIG. 3) located in an upper side of the touched region 3 as the touch reflection region. When the portable terminal 100 is tilted toward a right side and upward, the touch reflection region determiner 112 determines a region (e.g., second region 2 of FIG. 3) located in a diagonal line of the touched region as the touch reflection region. The touch reflection region determiner 112 may change a determined touch reflection region according to a tilt change signal. Conversely, when the tilt change signal is not inputted, the touch reflection region determiner 112 may maintain a previously determined touch reflection region.

If the touch reflection region is determined, the coordinate converter 113 may convert touch coordinates of a region in which the touch is detected into a touch coordinates of the determined touch reflection region. For example, assuming that the plurality of touch regions have the same size and the transverse (X axis) size and the longitudinal (Y axis) size have a size of 100×200, when the touch reflection region is located in a right side of the touch detection region, the coordinate converter 113 adds 100 to an X axis coordinate to convert a coordinate. When the touch reflection region is located in an upper side of the touch detection region, the coordinate converter 113 adds 200 to a Y axis coordinate to convert the coordinate. When the touch reflection region is located in a right side diagonal direction of a touch detection region, the coordinate converter 113 may add 100 to the X axis coordinate and add 200 to the Y axis coordinate to convert the coordinate. By contrast, when the touch reflection region is located in a left side of the touch detection region, the coordinate converter 113 subtracts 100 from the X axis coordinate to convert the coordinate. When the touch reflection region is located in a lower side of the touch detection region, the coordinate converter 113 subtracts 200 from the Y axis coordinate to convert the coordinate. When the touch reflection region is located in a lower left diagonal direction of the touch detection region, the coordinate converter 113 may subtract 100 from the X axis coordinate and subtract 200 from the Y axis coordinate to convert the coordinate. When the touch reflection region is the same as the touch region, a procedure of converting the coordinate is not performed.

The function executor 114 may execute a function corresponding to touch input. Particularly, the function executor 114 may execute a function linked with a coordinate transferred from the coordinate converter 113 in one hand touch mode. For example, the function executor 114 may execute a function linked with the touch detection region or the touch reflection region according to a tilted state of the portable terminal 100.

Although not shown in FIG. 1, the portable terminal 100 may further include constituent elements having additional functions such as a Global Positioning System (GPS) for receiving location information, a broadcast receiving module for receiving broadcast, a digital sound source playback module, and an Internet communication module executing Internet functions. Since the structural elements can be variously changed according to a convergence trend of a digital device, not all elements can be listed. However, the portable terminal 100 may include structural elements equivalent to the foregoing structural elements.

Figure 2:
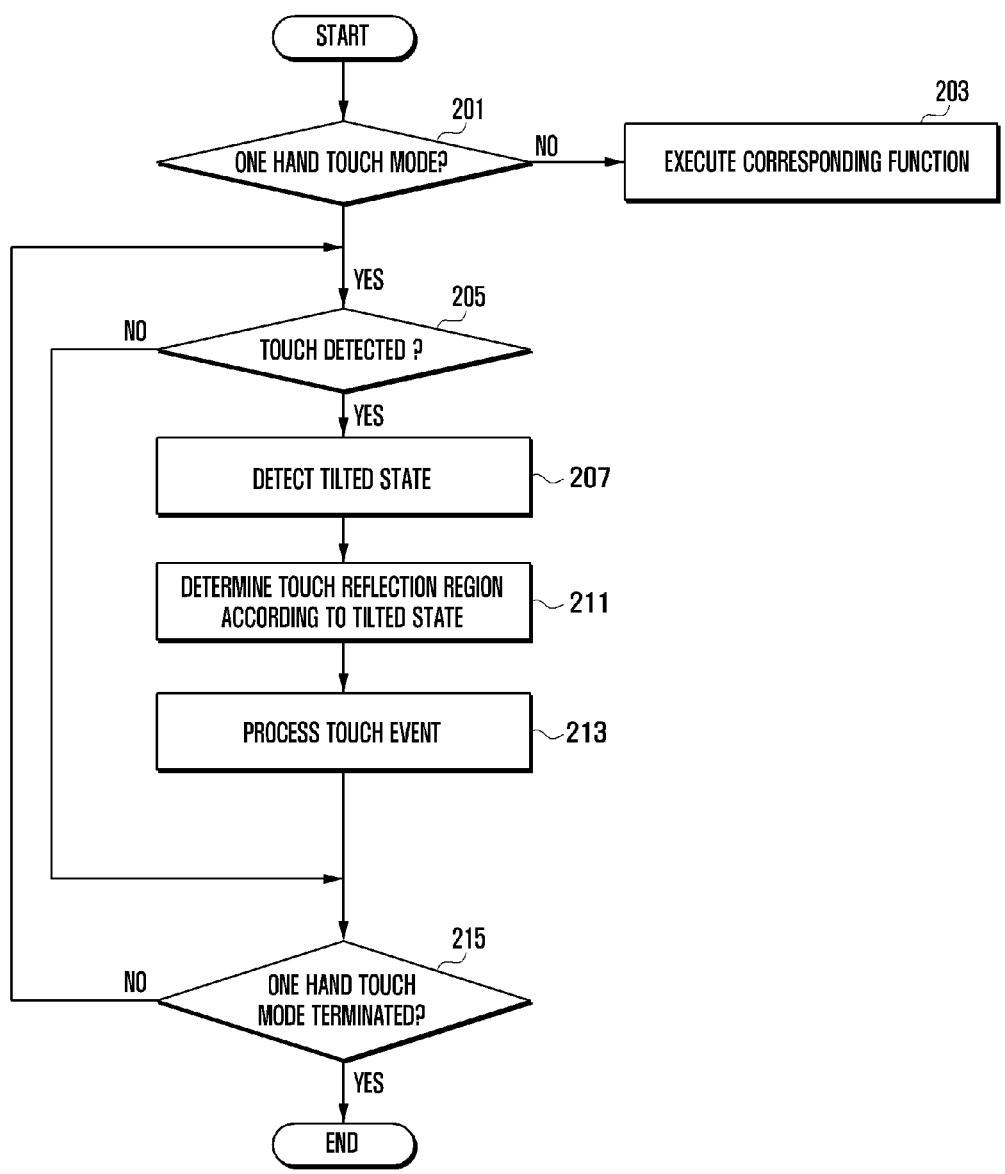
FIG. 2 is a flowchart illustrating a touch input method of a portable terminal according to an exemplary embodiment of the present invention.

FIG. 2 is a flowchart illustrating a touch input method of a portable terminal according to an exemplary embodiment of the present invention.

Referring to FIGS. 1 and 2, a controller 110 according to the exemplary embodiment of the present invention may determine whether a one hand touch mode is executed in step 201.

The one hand touch mode is a mode which divides a touch region of the touch screen 130 into a plurality touch regions, and may input touch with respect to an entire region of the touch screen 130 using one of the plurality of touch regions.

When the one hand touch mode is not activated, the controller 110 may execute a corresponding function in step 203. For example, the controller 110 may execute a music playback function and a moving image playback function according to a request of the user. In addition, the portable terminal 100 may activate a touch region of the touch screen 130 as a general touch mode which is not divided.

Meanwhile, if the one hand touch mode is activated, the controller 110 may determine whether touch is detected in one of the touch regions in step 205. The touch is not detected, the controller 110 proceeds to step 215 to be described below. Conversely, when the touch is detected, the controller 110 may detect a tilted state of the portable terminal 100 in step 207. For example, the controller 110 may detect whether the portable terminal 100 is tilted toward at least one of up, down, left, and right directions. In detail, the controller 110 may activate the sensor 170 capable of measuring a tilt of the portable terminal 100, and analyze a tilt signal inputted from the sensor 170 to determine whether the portable terminal 100 is tilted toward at least one of up, down, left, and right directions greater than a preset reference value (e.g., 20°) based on a tilted state of the portable terminal 100 when the touch is detected.

The controller 110 may determine a touch reflection region according to a tilted state of the portable terminal 100 in step 211. For example, when the portable terminal 100 is not tilted, the controller 110 may determine a region in which the touch is detected as the touch reflection region. When a touch release event occurs in a specific location of the region in which the touch is detected, the controller 100 may execute a function allocated to the touch release event in the specific location. When the touch maintained in a specific location of a touched region for greater than a predetermined time, the controller 110 may recognize the touch as a long touch event, and execute a function allocated to the long touch event in the specific location. The controller 110 may move a web page according to the touch movement event or enlarge or reduce the web page according to a stretch gesture and a pinch gesture.

When the portable terminal 100 is tilted to a right side in a state where a touch region is divided in two rows and two columns, the controller 110 determines a right region of the touched region as the touch reflection region. When the portable terminal 100 is tilted upward, the controller 110 may determine an upper region of the touched region as the touch reflection region.

If determination of the touch reflection region is completed, the controller 110 may process a touch event in a region in which a touch is detected as a touch event generated in the determined touch reflection region in step 213. To do this, the controller 110 may perform coordinates conversion. The coordinate convention was as described above, and thus a detailed description thereof is omitted. For example, when a touch release event occur in the region in which the touch is detected, the controller 110 converts coordinates of a location in which a touch is released into coordinates of the determined touch reflection region, and executes a function allocated to a touch release event in the converted coordinates. When the touch maintains in the region in which the touch is detected for a preset time, the controller 110 converts coordinates in which a touch maintains into coordinates of the determined touch reflection region, and executes a function allocated to a long touch event in the converted coordinates. The touch event will be described in detail with reference to FIG. 3 below.

Next, the controller 110 may determine whether the one hand touch mode is terminated in step 215. When the one hand touch mode is not terminated, the controller 110 returns to step 205 and repeats the foregoing procedures. Conversely, when the one hand touch mode is terminated, the controller 110 may terminate control of the one hand touch mode and control a general touch mode.

Figure 3:
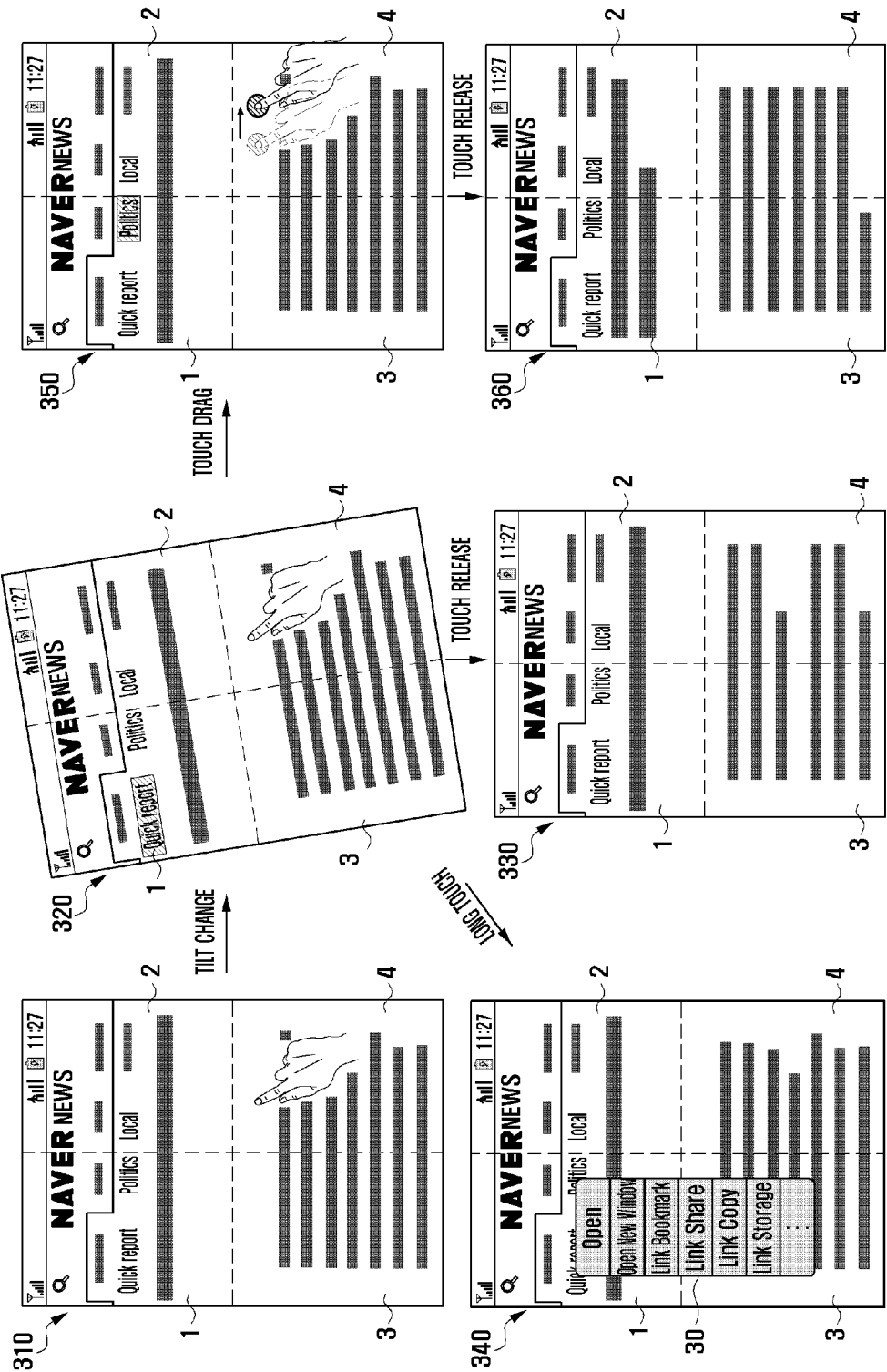
FIG. 3 is an exemplary diagram of a screen illustrating a touch input method of a portable terminal according to an exemplary embodiment of the present invention.

FIG. 3 is an exemplary diagram of a screen illustrating a touch input method of a portable terminal according to an exemplary embodiment of the present invention. The following description will be made on the assumption that a web page is output by way of example for convention of the description. However, the present invention is not limited thereto. Persons of ordinary skill in the art will appreciate that the present invention is applicable to all screens capable of inputting a touch. For convenience of description, it is assumed that the touch screen 130 is divided into two rows and two columns, that is, four touch regions.

Referring to FIGS. 1 to 3, a controller 110 according to the exemplary embodiment of the present invention may be controlling to display a web page on a touch screen 130 as illustrated in an exemplary diagram of a screen of reference numeral 310. Dotted lines separating four touch regions 1, 2, 3, and 4 illustrated in an exemplary diagram of a screen of reference numeral 310 may be displayed or not on a screen according to intention of a designer. The portable terminal 110 may provide a menu capable of turning-on/off display of the dotted line so as to set the presence of display of the dotted line.

The user may touch, for example, a fourth region 4 of the four touch regions 1, 2, 3, 4 in a state where the web page is outputted. When a tilted state is not changed greater than the reference value in a tilted state of the portable terminal 100 when the fourth region is touched, the controller 110 may determine the fourth region 4 in which the touch is detected as a touch reflection region. For example, when a touch release event, a long touch event, or a touch drag even occurs without changing a tilt of the portable terminal 100, the controller 110 may process the touch release event, the long touch event, or the touch drag event as a touch event generated from the fourth region 4. For example, when a link exists in a location in which the touch release event is generated, the controller 110 executes the linked function. When the long touch event occurs, the controller 110 may output a pop-up window including a plurality of menus. When the touch drag event occurs, the controller 110 may move a web page output to the touch screen 130 corresponding to the touch drag.

To perform touch input with respect to a region other than a touched fourth region 4, the user may tilt the portable terminal 100 in a specific direction. For example, as illustrated in an exemplary diagram of a screen of reference numeral 320, the user may tilt the portable terminal 100 in a direction of the first region 1. In this case, it is preferable that tilting of the portable terminal 100 is performed within a preset time to recognize the long touch event.

If tilt change of the portable terminal 100 to the direction of the first region 1 is detected, the controller 110 determines the first region 1 as the touch reflection region and may convert touch input of the fourth region 4 into touch input of the first region 1. To do this, the controller 110 may perform a coordinate conversion procedure. In this case, when a link is located in the converted coordinates, the controller 110 may highlight the link to inform that the link is selected. For example, the controller 110 may highlight a "quick report" link as illustrated in an exemplary diagram of a screen of reference numeral 320. In this state, when the touch release event occurs, the controller 110 may output a web page corresponding to the "quick report" link as illustrated in an exemplary diagram of reference numeral 330.

In a state of an exemplary diagram of a screen of reference numeral 320, when a long touch event in which a touch is maintained for a predetermined time occurs, the controller 110 may execute a function allocated to the long touch event. For instance, the controller 110 may output a menu window 30 including a plurality of menu items capable of being performed with the "quick report" link as illustrated in an exemplary diagram of a screen of reference numeral 340. In this case, a predetermined time for recognizing a long touch event of the "quick report" link may be counted from a time when tilt change of the portable terminal 100 different from a touch time of the fourth region 4 is detected.

Meanwhile, when a touch drag event occurs within the predetermined time after the first region 1 is determined as the touch reflection region, the controller 110 may move a highlight of the first region to a next link of the touch drag direction according to touch drag in the fourth region 4. For example, as illustrated in an exemplary diagram of a screen of reference numeral 350, the controller 110 may move the highlight located in the "quick report" link of the first region 1 to the "politic" link according to a touch drag event generated from the fourth region 4.

In a state of an exemplary diagram of a screen of reference numeral 350, when a touch release event occurs within the predetermined time, the controller 110 may output a web page corresponding to the "politic" link as the exemplary diagram of a screen of reference numeral 360. Meanwhile, although not shown, when the touch maintains within a predetermined time after the touch is dragged from the "quick report" link to the "politic" link, the controller 110 may output a menu window including a plurality of executable menus with respect to the "politic" link. In this case, the controller 110 may count a touch maintenance time from a stop time point of touch drag in the fourth region 4 to recognize long touch with respect to the "politic" link.

Meanwhile, in FIG. 3 it has been illustrated that a touch is inputted in the first region 1 using the fourth region 4, but the present invention is not limited thereto. For example, the present invention may input a touch in another region using one of a plurality of touch regions.

FIG. 4 is an exemplary diagram of a screen illustrating a touch input method of a portable terminal according to another exemplary embodiment of the present invention. For the purpose of convenience, a screen to which a web page is outputted is exemplified. However, the present invention is not limited thereto, but persons of ordinary skill in the art will appreciate that the present invention is applicable to all screens. For convenience of description, it is assumed that the touch screen 130 is divided into two rows and two columns, that is, four touch regions.

Referring to FIGS. 1 and 4, a controller 110 according to another exemplary embodiment of the present invention may output a web page on a touch screen 130 as illustrated in an exemplary diagram of a screen of reference numeral 410. Dotted lines separating four touch regions 1, 2, 3, and 4 illustrated in an exemplary diagram of a screen of reference numeral 410 may be displayed or not displayed on a screen according to intention of a designer. The portable terminal 110 may provide a menu capable of turning-on/off display of the dotted line so that the display of the dotted line may be set by user.

The user may touch one of four touch regions 1, 2, 3, 4, for example, a fourth region 4 in a state where the web page is outputted. When a tilted state is not changed greater than the reference value in a tilted state of the portable terminal 100 when the fourth region is touched, the controller 110 may determine the fourth region 4 in which the touch is detected as a touch reflection region. For example, when a touch release event, a long touch event, or a touch drag event occurs without changing a tilt of the portable terminal 100, the controller 110 may process the touch release event, the long touch event, or the touch drag event as a touch event generated from the fourth region 4 as illustrated in FIG. 3.

Meanwhile, to perform a touch input with respect to a region other than the touched fourth region 4, the user may tilt the portable terminal 100 in a specific direction. For example, as illustrated in an exemplary diagram of a screen of reference numeral 420, the user may tilt the portable terminal 100 in a direction of the first region 1. In this case, it is preferable that the tilting of the portable terminal 100 is performed within a predetermined time set to recognize a long touch event.

If tilt change of the portable terminal 10 in a direction of the first region 1 is detected, the controller 110 may determine the first region 1 as the touch reflection region and convert touch input of the fourth region 4 into touch input of the first region 1. To do this, the controller 110 may perform a coordinates converting procedure. In this case, the controller 110 may output a graphic object, for example, an image 40 of an arrow shape to the converted coordinates.

In a state like an exemplary diagram of a screen of reference numeral 420, the user may perform touch drag in the fourth region 4 to select a specific link as illustrated in an exemplary diagram of a screen of reference numeral 430. When the touch drag occurs in the fourth region 4, the controller 110 may move the graphic object 40 of the first region corresponding to the touch drag. In this case, when the graphic object 40 is moved to a region having link information, the controller 110 may change a shape of the graphic object as illustrated in an exemplary diagram of a screen of reference numeral 430. Meanwhile, when a tilted state of the portable terminal 100 is changed to change the touch reflection region, the controller 110 may move the graphic object 40 to the changed touch reflection region.

Meanwhile, to avoid repetition with FIG. 3, although not shown in FIG. 4, the controller 110 may process a touch event generated from the fourth region 4 as a touch event generated from the first region determined as the touch reflection region as illustrated in FIG. 3.

FIG. 5 is an exemplary diagram of a screen illustrating a touch input method of a portable terminal according to a still another exemplary embodiment of the present invention.

Referring to FIGS. 1 and 5, a touch region of a tough screen 130 according to the still another exemplary embodiment of the present invention may be divided into six touch regions 11, 12, 13, 14, 15, and 16 which are arranged in three rows and two columns.

As illustrated in an exemplary diagram of a screen of reference numeral 510 of FIG. 5, when a portable terminal 100 is tilted upward in a state where a sixth region 16 of six touch regions 11, 12, 13, 14, 15, and 16 is touched, the controller 110 may determine the fourth region 4 as the touch reflection region and perform a coordinates converting procedure. Next, the controller 100 may display the graphic object 40 on the converted coordinates as illustrated in an exemplary diagram of a screen of reference numeral 520. For example, the controller 110 may display the graphic object 40 on the fourth region 14.

When an upper tilt maintains for a preset time (e.g., one second) in a state of reference numeral 520, the controller 110 may determine the second region 12 as the touch reflection region as illustrated in an exemplary diagram of a screen of reference numeral 530, perform a coordinates converting procedure, and then move the graphic object 40 to the second region 12. Meanwhile, when the portable terminal 100 is tilted to left side in a state of reference numeral 520, the controller 110 may determine the third region 13 as the touch reflection region as illustrated in an exemplary diagram of a screen of reference numeral 540, perform a coordinates converting procedure, and then move the graphic object 40 to the third region 13. As described above, the controller 110 may move the graphic object 40 to a touch reflection region determined according to tilted state change of the portable terminal 100.

As described above, if selection of the touch reflection region is completed through detection of the tilted state of the portable terminal 100, the user may restore the portable terminal 100 to an original tilt (e.g., tilt when touch is detected in the sixth region 16). In this case, the controller 110 may count a touch maintenance time from the time when the tilt of the portable terminal 100 is restored to recognize a long touch event.

A procedure after the tilt of the portable terminal 100 is restored is similar to a procedure as illustrated in FIG. 3. For example, the controller 110 may move a graphic object 40 of the fourth region 14 according to a touch drag event in the sixth region 16 as illustrated in an exemplary diagram of a screen of reference numeral 550. The controller 110 may control execution of a function according to generation of the touch release event and the long touch event.

Meanwhile, FIG. 5 illustrates that a user recognizes a touch reflection region determined through movement of the graphic object 40, but the present invention is not limited thereto. For example, the controller 110 may display the determined touch reflection region visually separately from another region so that the user may easily recognize the determined touch reflection region. For example, the controller 110 highlights and displays the whole touch reflection region selected according to a tilted state of the portable terminal 100. When the tilt of the portable terminal 100 returns to an original state, the controller 110 may remove the highlight of the touch reflection region. The controller 110 differently displays contrast of the touch reflection region selected according to a tilted state of the portable terminal 100. When the tilt of the portable terminal 100 returns to an original state, the controller 110 may restore the original contrast of the selected touch reflection region.

The foregoing method for a touch input method of a portable terminal may be implemented in an executable program command form by various computer means and be recorded in a non-transitory computer readable recording medium. In this case, the non-transitory computer readable recording medium may include a program command, a data file, and a data structure individually or a combination thereof. In the meantime, the program command recorded in a recording medium may be specially designed or configured for the exemplary embodiments of the present invention or be known to a person having ordinary skill in a computer software field to be used. The non-transitory computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as Read Only Memory (ROM), Random Access Memory (RAM), and flash memory storing and executing program commands. Further, the program command includes a machine language code created by a complier and a high-level language code executable by a computer using an interpreter. The foregoing hardware device may be configured to be operated as at least one software module to perform an operation described herein.

As mentioned above, the touch input method and apparatus of a portable terminal according to the exemplary embodiments of the present invention may divide a touch screen into a plurality of regions, and perform touch input with respect to an entire region of a touch screen through one of the divided regions. For example, the exemplary embodiments of the present invention enable touch input without directly touching a region with which a finger makes contact. Accordingly, the exemplary embodiments of the present invention can improve convenience for a user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A touch input method of a portable terminal, the method comprising:
   detecting a touch input on one of a plurality of divided touch regions of a touch screen;
   detecting a tilted state of the portable terminal when the touch input is detected;
   determining one of the plurality of divided touch regions as a touch reflection region in which a touch event generated from a region in which the touch input is detected is reflected according to the detected tilted state of the portable terminal; and
   processing the touch event generated from the region in which the touch input is detected as the touch event reflected in the determined touch reflection region.

2. The touch input method of claim 1, wherein the processing of the touch event comprises converting touch coordinates of the region in which the touch input is detected into touch coordinates of the determined touch reflection region.

3. The touch input method of claim 2, wherein the processing of the touch event comprises:
   focusing a link when the link exists at the converted touch coordinates; and
   moving the focus to another link corresponding to a touch drag event generated from a touch region in which the touch input is detected.

4. The touch input method of claim 2, wherein the processing of the touch event comprises displaying a graphic object at the converted touch coordinates.

5. The touch input method of claim 4, wherein the graphic object is moved to another touch reflection region determined according to a tilted state change of the portable terminal.

6. The touch input method of claim 2, wherein the processing of the touch event comprises:
   executing a function allocated to a touch event at the converted touch coordinates when the detected touch input is released within a preset time; and
   executing a function allocated to a long touch event at the converted touch coordinates when the detected touch is maintained for the preset time.

7. The touch input method of claim 1, further comprising:
   determining whether one hand touch mode in which the touch region of the touch screen is divided into the plurality of touch regions, and in which a touch is inputted through one of the divided plurality of touch regions is activated; and
   operating the portable terminal in the one hand touch mode when the one hand touch mode is activated, and operating the portable terminal in a touch mode which does not divide the touch region of the touch screen when the one hand touch mode is not activated.

8. The touch input method of claim 1, wherein the detecting of the tilted state of the portable terminal comprises determining whether a tilt of the portable terminal is changed by more than a preset reference value within a preset time in one of up, down, left, and right directions based on the tilted state of the portable terminal.

9. The touch input method of claim 1, further comprising displaying the determined touch reflection region visually separately from other touch regions.

10. The touch input method of claim 1, wherein the determining of the one of the touch regions is performed when a tilt of the portable terminal is restored to a previous state after the tilted state of the portable terminal is changed.

11. A touch input apparatus of a portable terminal, the apparatus comprising:
   a touch screen divided into a plurality of touch regions;
   a sensor measuring a tilted state of the portable terminal; and
   a controller detecting the titled state of the portable terminal, determining one of the plurality of divided touch regions as a touch reflection region which a touch event generated from a region in which the touch input is detected is reflected according to the detected tilted state of the portable terminal, and processing the touch event generated from a touch region in which the touch input is detected as the touch event reflected in the determined touch reflection region when the touch input is detected from one of the touch regions.

12. The touch input apparatus of claim 11, wherein the controller converts touch coordinates of the region in which the touch input is detected into touch coordinates of the determined touch reflection region.

13. The touch input apparatus of claim 12, wherein the controller focuses a link when the link exists at the converted touch coordinates, and moves the focus to another link corresponding to a touch drag event generated from a touch region in which the touch input is detected.

14. The touch input apparatus of claim 12, wherein the controller controls the touch screen to display a graphic object at the converted touch coordinates.

15. The touch input apparatus of claim 14, wherein the controller controls the touch screen to move the graphic object to another touch reflection region determined according to a tilted state change of the portable terminal.

16. The touch input apparatus of claim 12, wherein the controller executes a function allocated to a touch event at the converted touch coordinates when the detected touch input is released within a preset time, and executes a function allocated to a long touch event at the converted touch coordinates when the detected touch is maintained for the preset time.

17. The touch input apparatus of claim 11, wherein the controller divides the touch region of the touch screen into the plurality of touch regions to determine whether a one hand touch mode controlling touch input is activated, operates the portable terminal in the one hand touch mode when the one hand touch mode is activated, and operates the portable terminal in a touch mode which does not divide the touch region of the touch screen when the one hand touch mode is not activated.

18. The touch input apparatus of claim 11, wherein the controller determines whether a tilt of the portable terminal is changed by more than a preset reference value within a preset time in one of up, down, left, and right directions based on the tilted state of the portable terminal.

19. The touch input apparatus of claim 11, wherein the controller controls the touch screen to display the determined touch reflection region visually separately from other touch regions.

20. The touch input apparatus of claim 11, wherein the controller determines the one of the touch regions as the touch reflection region when a tilt of the portable terminal is restored to a previous state after the tilted state of the portable terminal is changed.

* * * * *